United States Patent
Völp et al.

(10) Patent No.: US 7,657,034 B2
(45) Date of Patent: Feb. 2, 2010

(54) DATA ENCRYPTION IN A SYMMETRIC MULTIPROCESSOR ELECTRONIC APPARATUS

(75) Inventors: Marcus Völp, Karlsruhe (DE); Claude Anguille, Aix En Provence (FR)

(73) Assignee: STMicroelectronics SA, Montrouge (FR)

( * ) Notice: Subject to any disclaimer, the term of this patent is extended or adjusted under 35 U.S.C. 154(b) by 820 days.

(21) Appl. No.: 10/966,833

(22) Filed: Oct. 14, 2004

(65) Prior Publication Data
US 2005/0138403 A1  Jun. 23, 2005

(30) Foreign Application Priority Data
Oct. 17, 2003  (FR) .................................. 03 12206

(51) Int. Cl.
*H04L 9/20* (2006.01)

(52) U.S. Cl. .................. 380/268; 380/37; 380/259; 380/277; 713/193

(58) Field of Classification Search ............ None
See application file for complete search history.

(56) References Cited

U.S. PATENT DOCUMENTS

| | | | | |
|---|---|---|---|---|
| 5,438,622 A | * | 8/1995 | Normile et al. | 380/46 |
| 5,915,025 A | * | 6/1999 | Taguchi et al. | 380/44 |
| 6,061,449 A | | 5/2000 | Candelore et al. | 380/28 |
| 6,115,816 A | * | 9/2000 | Davis | 713/153 |
| 6,857,076 B1 | * | 2/2005 | Klein | 713/189 |
| 7,278,016 B1 | * | 10/2007 | Detrick et al. | 713/2 |
| 7,328,352 B2 | * | 2/2008 | Fontijn et al. | 713/193 |
| 7,334,124 B2 | * | 2/2008 | Pham et al. | 713/162 |
| 2003/0196081 A1 | * | 10/2003 | Savarda et al. | 713/153 |
| 2004/0247129 A1 | * | 12/2004 | Patariu et al. | 380/277 |
| 2005/0213766 A1 | * | 9/2005 | Goss | 380/277 |

FOREIGN PATENT DOCUMENTS

| EP | 1 229 427 A2 | 8/2002 |
|---|---|---|
| WO | WO 99/12310 | 3/1999 |

OTHER PUBLICATIONS

Dongara et al., "Accelerating Private-Key Cryptography via Multithreading on Symmetric Multiprocessors", IEEE, Mar. 2003, Retrieved from the Internet on Jan. 2, 2009: <URL: http://ieeexplore.ieee.org/xpls/abs_all.jsp?arnumber=1190233>.*

* cited by examiner

*Primary Examiner*—Minh Dinh
(74) *Attorney, Agent, or Firm*—Lisa K. Jorgenson; Eric M. Ringer; Seed IP Law Group PLLC

(57) ABSTRACT

For the encryption of data to be stored in a memory external to a circuit, provision is made to store in the external memory encrypted data words in association with an initialization vector and a key identifier associated with a secret key that has served to encrypt same.

20 Claims, 1 Drawing Sheet

DATA ENCRYPTION IN A SYMMETRIC MULTIPROCESSOR ELECTRONIC APPARATUS

BACKGROUND OF THE INVENTION

1. Field of the Invention

The present invention relates generally to the encryption or enciphering of data intended to be used in one or more processors, when these data have to be stored in a memory external to the processors.

2. Description of the Related Art

It finds applications, in particular, in electronic apparatuses having an architecture with several symmetric processors and with shared external memory (or SMP architecture, standing for "Symmetric MultiProcessor"). More precisely, the present invention relates to applications in which one wishes to prevent an unauthorized user from accessing data in a utilizable manner, and in which it must be possible, at least in part, for said data to be accessed by more than one circuit.

Reference is made here to the term "data" to indiscriminately designate any binary code whether it concerns executable programs, or concerns binary data that are processed by these programs. Moreover, reference is made to the term "circuit" to indiscriminately designate any functional unit of an electronic apparatus that is linked to other functional units via one or more communication buses, whether it concern a processor, a controller of a peripheral (for example a disk controller), a network card, etc.

FIG. 1 diagrammatically illustrates the SMP architecture of an electronic apparatus, to which the present invention is applied. Several processors 2 (CPU) are coupled to an external memory 4 (EXT MEM), by way of one or more buses 3. It is possible to define an area 1, the so-called secure area, inside which is one or more processors 2, and inside which it is considered that the processed data cannot be hacked into. In practice, the secure area 1 usually comprises one or more integrated-circuit chips corresponding to respective processors, the memory 4 being another chip which does not belong to the secure area. Furthermore, other circuits 5, such as a disk controller (DSK CTRL) or a network card (NET CARD), may be linked to the processors 2 by way of the buses 3.

The encryption to which the present invention is applied relates more particularly to that of the data travelling over the bus or buses 3, between the memory 4 and the processor or processors 2 of the area 1. In the jargon of the person skilled in the art, one speaks of encryption of the memory or else of encryption of the bus. This encryption consists in encoding the data stored in the memory 4 by means of a bus encryption key known to the processors involved.

Exemplary solutions for encrypting a memory external to a microprocessor are described in U.S. Pat. Nos. 5,825,878; 5,982,887; and 6,041,449.

These solutions are not suitable in the case of SMP architecture systems, in so far as the same bus encryption key has to be used to encrypt and to decrypt the data while each processor uses its own individual bus encryption key. Specifically, measures have to be taken to allow another processor of the secure area to decrypt, with a view to using them, data encrypted and stored in the external memory shared by another processor of the said secure area. These measures have however to be compatible with the secret-key nature of the bus encryption keys.

Another constraint is related to the encryption procedure used. In the prior art, one generally uses block encryptions with DES ("Data Encryption System") or AES ("Advanced Encryption System") type algorithms, according to a so-called ECB ("Electronic Code Book") mode or a so-called CBC ("Cipher-Block Chaining") mode. The size of a block depends on the encryption algorithm used. In the ECB mode, two identical blocks are encrypted in the same manner. Attacks are therefore possible, by the so-called "dictionary" technique, in so far as the redundancy of messages encrypted in an identical manner may allow the identification of the clear messages. On the other hand, in the CBC mode, each block is encrypted as a function of the previous blocks. This mode is more robust. Nevertheless, it requires sequential access to the memory, thereby rendering it incompatible with the encryption of data that one wishes to be able to access randomly in the external memory.

BRIEF SUMMARY OF THE INVENTION

An embodiment of the present invention proposes, within the context of an electronic apparatus with SMP architecture, a novel technique of encryption, by a processor, of data to be stored in a memory external to this processor, when the data have to be utilizable by more than one processor.

A first embodiment of the invention makes provision for a method of encryption in a circuit of an electronic apparatus, of data to be stored in a memory external to the said circuit, comprising the steps of:

selecting a secret key, from a list of secret keys respectively stored in a set of registers of the circuit each in association with a key identifier, at least one of the said keys being a key shared with at least one other circuit of the electronic apparatus;

segmenting the data into a stream of data words of determined size;

and, continuously for each data word, generating a pseudorandom number of determined size by a pseudorandom generator implementing a generating algorithm based on the secret key and on an initialization vector changing value with each data word;

combining the data word and the corresponding pseudorandom number, so as to generate an encrypted data word; then, storing in said external memory each data word encrypted in association with the initialization vector and the key identifier associated with the secret key that has served to encrypt same.

A second embodiment of the invention makes provision for a method of decryption, in a circuit of an electronic apparatus, of data stored in the form of data words encrypted in a memory external to the said circuit, comprising the steps of:

reading from the external memory an encrypted data word together with an initialization vector and with a secret-key identifier which are respectively associated with the data word;

selecting a secret key, on the basis of a list of secret keys respectively stored in a set of registers of the circuit and at least one of which is a key shared with at least one other circuit of the electronic apparatus, and on the basis moreover of the identifier;

and, continuously for each encrypted data word, generating a pseudorandom number of determined size, by a pseudorandom generator implementing a generating algorithm based on the secret key and on said initialization vector; and, combining the data word and the corresponding pseudorandom number, to generate a decrypted data word.

A third embodiment of the invention pertains to a device for the implementation of a method of encryption according to the first aspect, comprising:

a set of registers storing respective secret keys, one at least of which is a key shared with another circuit of the electronic apparatus, each in association with a key identifier;

a unit for selecting secret keys that is suitable for selecting a secret key from the list of keys stored in the set of registers;

a segmentation unit suitable for segmenting the data in such a way as to form a stream of data words of determined size;

a generator of initialization vectors which is suitable for generating a stream of initialization vectors changing value with each data word;

a generator of pseudorandom numbers implementing a generating algorithm suitable for generating, for each data word, based on the secret key and on a determined one of the initialization vectors, a pseudorandom number of determined size;

a combination unit suitable for continuously combining the data word and the corresponding pseudorandom number, so as to generate an encrypted data word; and, means for storing in said external memory each data word encrypted in association with said determined initialization vector and the key identifier associated with the secret key that has served to encrypt same.

Moreover, according to a fourth embodiment, the invention proposes a device for the implementation of a method of decryption according to the second aspect. This device comprises:

a set of registers storing respective secret keys at least one of which is a shared key, each in association with a key identifier;

reading means for reading from said external memory a data word together with an initialization vector and with an identifier of a secret key which are respectively associated with the data word;

selection means for selecting, for each data word, a secret key on the basis of a list of keys stored in said registers and on the basis further of the key identifier;

a generator of pseudorandom numbers implementing a generating algorithm suitable for generating, for each data word, on the basis of said secret key and of the initialization vector, a pseudorandom number of determined size; and a combination unit suitable for combining the data word and the corresponding pseudorandom number, in such a way as to decrypt the data word.

A fifth embodiment of the invention relates to a circuit comprising an encryption/decryption unit forming an encryption device according to the third embodiment and a decryption device according to the fourth embodiment. The set of registers, the pseudorandom number generator and the combination unit are then common to the two devices.

According to a sixth embodiment, the invention further proposes an electronic apparatus comprising at least two circuits according to the fifth embodiment, in which at least one of the secret keys is shared between the circuits in such a way as to form a secure subsystem.

The keys are said to be shared in the meaning that other circuits of the electronic apparatus know them, for example the circuits belonging to the secure area, that is to the secure subsystem. The invention thus offers a solution that makes it possible to customize the encryption according to the processor which carries it out, while ensuring that all the processors having authorization to use the data stored in the external memory will be able to decrypt them.

The encryption according to one embodiment of the invention is of the continuous encryption type ("Stream Cipher"), which is simpler and hence faster than block encryption. Continuous encryption is moreover insensitive to dictionary-based attacks, since the same data word is encrypted into a different word at each encryption.

Moreover, the encryption is compatible with random access to the external memory.

BRIEF DESCRIPTION OF THE SEVERAL VIEWS OF THE DRAWING(S)

Other characteristics and advantages of the invention will become further apparent on reading the description which follows. The latter is purely illustrative and should be read in conjunction with the appended drawings in which.

DETAILED DESCRIPTION OF THE INVENTION

Figure 1:
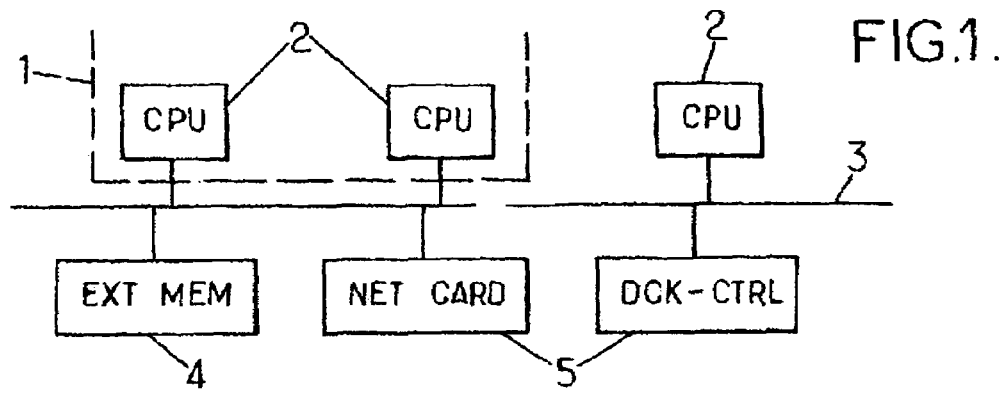
FIG. 1 is a diagram of an electronic apparatus to which the various aspects of the invention may be applied.

In the drawings, like elements are designated by like references in the various figures. For reasons of clarity, only the steps of the method and the elements that are necessary for the understanding of the invention have been represented and are described in what follows. In particular, not all the elements of a circuit have been detailed, the invention utilizing known components for the implementation thereof.

A characteristic of one embodiment of the present invention is the encrypting of the data (programs, any binary data) that are stored in an external memory shared by several circuits of an electronic apparatus. The data are encrypted by means of a secret key, individual to the circuit carrying out the encryption, which may be different from the secret key used by other circuits for comparable encryption.

In order to allow the use of the data encrypted by more than one circuit, at least some of the secret keys that may be used by a circuit are shared with one or more other circuits, that is they are known to these circuits while being secret with regard to the remainder of the system. A shared key defines a subsystem of circuits that can use common data stored in the external memory. Typically, this subsystem may correspond to a secure area such as presented in the Background section with regard to the diagram of FIG. 1.

Moreover, the data are stored in the external memory in association with an identifier of the secret key, which identifier has served to encrypt them. This identifier allows the authorized circuits to determine the secret key to be used for the decryption of the data. This identifier can correspond to an index in a set of internal registers in which the secret keys supported by a circuit are respectively stored. It is not therefore the secret key itself which is stored with the data encrypted by it, but the identifier of this secret key. The disclosure of the identifier by storage in the external memory does not introduce any weakness of encryption, since only the authorized circuits can know the secret key to be used on the basis of this identifier.

Another characteristic is that provision is made for encryption and decryption continuously, during transfers between a circuit and the external memory. This continuous encryption is obtained on the basis of chopping the data into words of determined size which are thereafter stored in encrypted form in the external memory. Provision is also made for the encryption to use the combination of a data word with a pseudorandom number, which number is generated on the basis of the secret key and of an initialization vector.

Advantageously, the initialization vector changes value for each word, preferably randomly, so as to strengthen the security of the encryption. The initialization vector that has served for the encryption of a data word is advantageously stored in the external memory in association with the encrypted data word, as is the identifier of the secret key, as indicated above. Problems related to continuous encryption that are conventionally incompatible with direct random accesses to a memory are thus circumvented.

Figure 2:
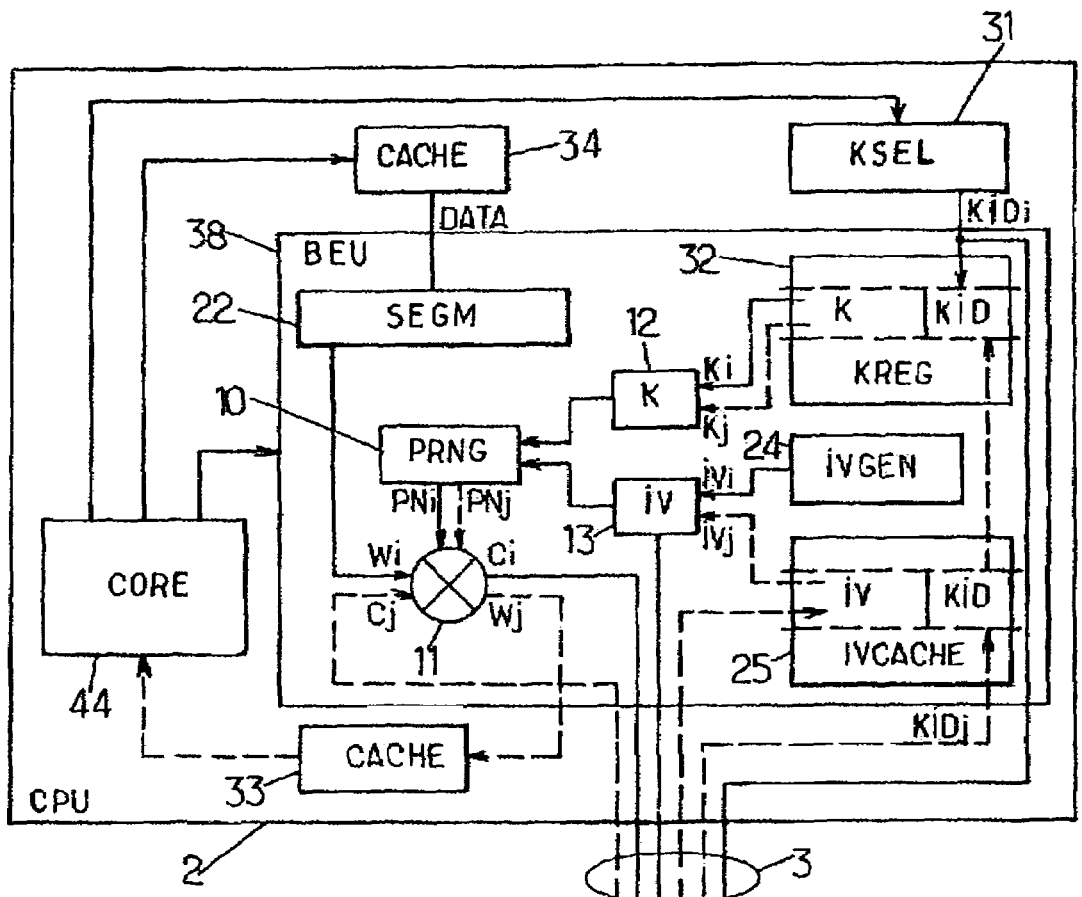
FIG. 2 is a functional diagram of an exemplary circuit coupled to an external memory, according to one embodiment of a circuit according to the invention.
Figure 2:
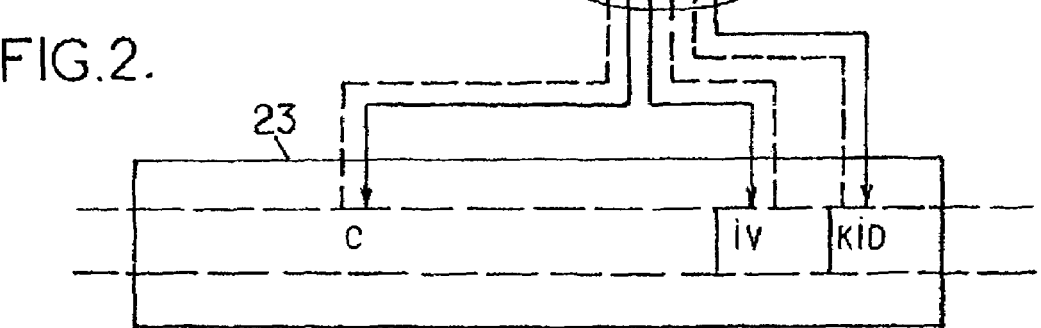

The diagram of FIG. 2 shows an exemplary embodiment of a circuit suitable for the implementation (illustrated by the solid arrows) of the encryption method and for the implementation (illustrated by the broken arrows) of the decryption method.

The circuit is here a processor 2 (CPU) comprising a processor core 44 (CORE), cache memories 33 and 34 (CACHE), an encryption key (K) selection unit 31 (KSEL), and an encryption/decryption unit 38 (BEU).

The unit 38 comprises a unit 22 (SEGM) for segmenting data, a set 32 (KREG) of registers of secret keys, a first pseudorandom generator 24 (IVGEN), a cache memory 25 (IVCACHE), an encryption key register 12 and an initialization vector register 13, a second pseudorandom generator 10 (PRNG), and finally a combination unit 11.

The function of the segmentation unit 22 is to segment the data to be encrypted (DATA) that it receives from the processor core 44, into data words (W) of determined size. A data word may thus comprise a single bit. Preferably, however the size of a word is equal to a byte, that is to say, a word comprises eight bits.

Each register of the set 32 is suitable for the non-volatile storage of the secret key (K) with which a secret-key identifier (KID) is associated. All or some of the secret keys may be provided to the processor via a secure channel, for example during the fabrication of the system. At least some of the secret keys may, conversely, be generated internally according to an ad-hoc algorithm whose description would be outside the scope of the present account. In an example preferred for its simplicity, the identifier is an index, such as a register number, making it possible to access the corresponding secret key out of the list of secret keys supported by the processor and stored in the set 32.

The random generator 24 is suitable for generating initialization vectors, at the rate of one initialization vector per data word to be encrypted, according to any pseudorandom algorithm.

The cache memory 25 is suitable for storing pairs each formed of an initialization vector and of a key identifier that are associated with a data word.

The register 12 is suitable for storing an encryption key, namely one of the secret keys stored in the set of registers 32. This register is indicated here for the clarity of the account, but it may be omitted if provision is made for suitable means for managing the set of registers 32.

The function of the initialization vector register 13 is to store the initialization vector generated continuously by the pseudorandom generator 24. Preferably, the size of the initialization vectors is equal to the size of the data words to be encrypted.

The role of the pseudorandom generator 10 is to continuously generate a stream of pseudorandom numbers (PN), at a rate of one such number per data word to be encrypted. Each pseudorandom number is generated on the basis of the encryption key stored in the register 12 and of the initialization vector stored in the register 13, the latter changing value with each data word.

In an example, the combination unit is an Exclusive-OR (XOR) gate. The pseudorandom generator 10 and XOR gate form a cryptosystem which, per se, is well known to the person skilled in the art. The encrypted data words that it delivers as output have the same size as the data words (before encryption) received as input. Such a cryptosystem has the advantage of providing a simple and hence fast encryption algorithm, the robustness of which with regard to security attacks is determined by the internal details of the pseudorandom generator 10. The more random is the number stream PN generated by the latter, the better is the security of the encryption algorithm. Another advantage of an encryption algorithm based on an XOR gate is that decryption is performed in the same manner as encryption, thereby simplifying the hardware design of the cryptosystem.

The manner of operation of the circuit in encryption mode will now be explained, by considering the solid arrows represented in FIG. 2.

The encryption mode is typically activated by the processor core 44 when data DATA stored in, or travelling through the cache memory 44 have to be written to the external memory 23, and have for this purpose to travel via the communication bus 3.

The core 44 orders the selection unit 31 to select one of the secret keys stored in the set of registers 32. In an example, the unit 31 selects a secret-key identifier KIDi associated with a determined secret key. This identifier KIDi is provided by the unit 31 to the encryption unit 38.

In the encryption unit 38, the key Ki associated with the identifier KIDi is read from the register set 32 with the aid of the said identifier KIDi, used for example as index for running through the set of registers 32. The key Ki is then stored in the register 12.

Additionally, the core 44 orders the cache memory 44 in such a way that the data DATA are provided to the encryption unit 38, and more particularly as input for the segmentation unit 22. The latter delivers a stream of binary words Wi each corresponding to a segment of the data stream DATA. In parallel, the pseudorandom generator 24 generates a stream of initialization vectors IVi, at the rate of delivery of the data words Wi by the unit 22, these initialization vectors changing value with each of the words Wi. Stated otherwise, with each data word Wi is associated an initialization vector IVi whose value is different from that of the initialization vector associated with the previous word in the data-word stream. The initialization vectors IVi, which are generated continuously, are stored in the register 13 each time.

For each data word Wi, the following operations are then performed continuously.

On the one hand, the pseudorandom generator 10 generates a pseudorandom number PNi on the basis of the secret key Ki stored in the register 12 and of the initialization vector IVi stored in the register 13. Each time, the number PNi is delivered on a second input of the XOR gate 11.

On the other hand, the data word Wi and the corresponding pseudorandom number PNi are combined by the XOR gate 11, in such a way as to generate an encrypted data word Ci.

The encryption unit 38 then stores the word Ci in the external memory 23, together and in association with the initialization vector IVi, and the secret-key identifier KIDi which have served to encrypt same. For this write, the encrypted data word Ci, the initialization vector IVi and the secret-key identifier KIDi travel by way of the communication bus 3. However, this is not a security weakness of the encryption method, in so far as the word Ci is encrypted, as the initialization vector IVi is not by itself sufficient to carry out decryption, and as the identifier KIDi has no significance for any other circuit to which the secret key associated with this identifier is not available.

The manner of operation of the circuit in decryption mode is now set forth by, considering the broken arrows represented in FIG. 2.

Under the control of the processor core 44, encrypted data words are read from the external memory 23 at determined addresses. Each word Cj thus read is delivered on the first input of the XOR gate 11. For each word Cj, the initialization vector IVj and the secret-key identifier KIDj which are associated with this word, are also read from the external memory 23.

On the basis of the identifier KIDj, the decryption unit 38 selects the secret key Kj associated with this identifier, by searching through the list of secret keys stored in the set of registers 32. The key Kj thus selected is stored in the register 12. In parallel, the vector IVj is stored in the register 13.

In fact, the vector IVj and the identifier KIDj travel via the cache memory 25. This placement in cache memory makes it possible to improve the performance of the decryption unit, in terms of decryption speed. The pseudorandom generator 10 then generates a pseudorandom number PNj on the basis of the key Kj stored in the register 12 and of the vector IVj stored in the register 13. The number PNj is delivered on the second input of the XOR gate 11.

The XOR gate 11 combines the encrypted data word Cj and the pseudorandom number PNj and delivers as output a data word Wj corresponding to the decrypted word Cj.

The decrypted data word Wj is then provided to the processor core 44 through the cache memory 33.

Of course, the present invention is open to diverse variants and modifications which will be apparent to the person skilled in the art. In particular, the invention may be implemented with any known continuous encryption algorithm conditioning the pseudorandom generator 10 on the basis of the secret key and of the initialization vectors. Moreover, it is assumed that the practical embodiment of the invention is within the scope of the person skilled in the art on the basis of the functional indications given hereinabove. In this regard, it will be noted that, according to one embodiment of the invention, described here, the various encryption and decryption tools are embodied via hardware resources of the processor. However, an implementation via software resources is of course conceivable.

Furthermore, the invention is not limited in any way to an application in a processor. Quite the contrary, an encryption/decryption unit such as the unit 38 described hereinabove may be envisaged in other circuits of an electronic apparatus such as represented in FIG. 1, in particular in the disk controller or in the network card.

All of the above U.S. patents, U.S. patent application publications, U.S. patent applications, foreign patents, foreign patent applications and non-patent publications referred to in this specification and/or listed in the Application Data Sheet are incorporated herein by reference, in their entirety.

It will also be noted that the totality of the data stored in the external memory does not necessarily have to be encrypted. In this regard, provision may be made for a key identifier having the value 0 to correspond to the absence of encryption of the corresponding data word, that is that the said data word is stored in clear in the external memory.

The invention claimed is:

1. A method of encryption in a first circuit of an electronic apparatus, of data to be stored in a memory external to the circuit, comprising:
    selecting a secret key, from a list of a plurality of secret keys respectively stored in a specified order in a set of registers of the first circuit each in association with a respective key identifier, wherein a number of the plurality of secret keys are shared secret keys that are also stored in a set of registers of a second circuit of the electronic apparatus, wherein the selected secret key is a shared secret key, wherein for each of the number of shared secret keys, the respective identifier associated with the respective shared secret key is a respective index to a respective register of the set of registers of the first circuit and to a respective register of the set of registers of the second circuit;
    segmenting the data into a stream of data words of determined size; and,
    continuously for each data word,
        generating a pseudorandom number of determined size by means of a pseudorandom generator implementing a generating algorithm based on the selected secret key and on an initialization vector changing value with each data word;
        combining the data word and the corresponding pseudorandom number, so as to generate an encrypted data word; then,
        storing in said external memory each data word encrypted in association with the initialization vector and the key identifier associated with the secret key that has served to encrypt same.

2. The method according to claim 1, wherein the combining is of Exclusive-OR type, the data words having a size equal to the size of the pseudorandom numbers.

3. The method according to claim 1, wherein at least one of the plurality of secret keys is individual to the circuit.

4. A method of decryption, in a circuit of an electronic apparatus, of data stored in the form of data words encrypted in a memory external to the circuit, comprising:
    reading from said external memory an encrypted data word together with an initialization vector and with a secret-key identifier which are respectively associated with said encrypted data word;
    selecting a secret key based on a list of a plurality of secret keys respectively stored in a specified order in a set of registers of the circuit, one of the secret keys being a key shared with another circuit of the electronic apparatus, and based on said secret-key identifier, wherein the selected secret key is a shared secret key, wherein the secret-key identifier associated with the secret key shared with said another circuit is an index to a respective register of the set of registers of the circuit and to a respective register of the set of registers of said another circuit; and,
    continuously for each encrypted data word,
        generating a pseudorandom number of determined size, by means of a pseudorandom generator implementing a generating algorithm based on said secret key and on said initialization vector; and
        combining the data word and the corresponding pseudorandom number, to generate a decrypted data word.

5. The method according to claim 4, wherein the combining is of Exclusive-OR type, the data words having a size equal to the size of the pseudorandom numbers.

6. The method according to claim 4, wherein the initialization vector and the secret-key identifier that are read from the external memory are stored in association with one another in a cache memory of the circuit.

7. An encryption device, comprising:
    a set of registers of a first circuit configured to store a number of secret keys in a specified order, at least one of the secret keys is a respective key shared with another circuit of the device, each secret key is associated with a respective key identifier, wherein for said at least one secret key shared with said another circuit, the respective key identifier associated therewith is an index to a respective register of the set of registers of the first circuit and to a respective register of a set of registers of said another circuit;

a secret keys selection unit configured to select a respective secret key from a list of the number of secret keys stored in the set of registers, wherein said respective secret key selected by the secret keys selection unit is said at least one secret key shared with said another circuit;

a segmentation unit configured to segment data in such a way as to form a stream of data words of determined size;

a generator of initialization vectors configured to generate a stream of initialization vectors changing value with each data word;

a generator of pseudorandom numbers configured to generate, for each data word, based on said secret key and on a determined one of the initialization vectors, a pseudorandom number of determined size;

a combination unit configured to combine the data word and the corresponding pseudorandom number, so as to generate an encrypted data word; and means for storing in an external memory each data word encrypted in association with the determined initialization vector and the key identifier associated with the secret key that has served to encrypt same.

8. A decryption device, comprising:

a set of registers of a first circuit configured to store a number of secret keys in a specified order, at least one of the secret keys is a respective secret key shared with another circuit, wherein each secret key is associated with a respective key identifier, wherein for the at least one secret key shared with said another circuit, the respective key identifier associated therewith is an index to a respective register of the set of registers of the first circuit and to a respective register of a set of registers of said another circuit;

reading means for reading from an external memory a data word together with an initialization vector and with an identifier of a respective secret key which are respectively associated with said data word;

selection means for selecting, for each data word, a respective secret key based on a list of keys stored in said registers and based on the key identifier, wherein said respective secret key selected by the selection means is said at least one secret key shared with said another circuit;

a generator of pseudorandom numbers configured to generate, for each data word, based on said selected secret key and on said initialization vector, a pseudorandom number of determined size; and a combination unit suitably configured to combine the data word and the corresponding pseudorandom number, in such a way as to decrypt said data word.

9. An electronic apparatus, comprising:

a first encryption/decryption unit that includes:
a first set of registers configured to store a plurality of secret keys in a specified order, one of which is a respective secret key shared with a second encryption/decryption unit, each in association with a respective key identifier, wherein the respective key identifier associated with the shared secret key is an index to a register of the first set of registers of the first encryption/decryption unit and is an index to a register of a second set of registers of the second encryption/decryption unit;

a first secret keys selection unit configured to select a secret key from the plurality of secret keys stored in the set of registers;

a first segmentation unit configured to segment data in such a way as to form a stream of data words of determined size;

a first generator of initialization vectors configured to generate a stream of initialization vectors changing value with each data word;

a first generator of pseudorandom numbers configured to generate, for each data word, based on said selected secret key and on a determined one of the initialization vectors, a pseudorandom number of determined size;

a first combination unit configured to combine the data word and the corresponding pseudorandom number, so as to generate an encrypted data word;

first means for storing in an external memory each data word encrypted in association with the determined initialization vector and the key identifier associated with the selected secret key that has served to encrypt same;

first reading means for reading from the external memory one of the encrypted data words together with the determined initialization vector and with the key identifier of the selected secret key that has served to encrypt the encrypted data word being read; and first selection means for selecting a respective secret key based on the list of keys stored in said registers and based on the key identifier read from the external memory, wherein the generator of pseudorandom numbers is structured to generate, for the encrypted data word read from the external memory, based on said secret key and on said initialization vector, a pseudorandom number of determined size; and wherein the combination unit is structured to combine the data word and the corresponding pseudorandom number, in such a way as to decrypt said encrypted data word read from the external memory.

10. The apparatus according to claim 9, wherein the first combination unit is an Exclusive-OR gate, the data words having a size equal to the size of the pseudorandom numbers.

11. The apparatus according to claim 9, wherein at least one of the secret keys is individual to the first encryption/decryption unit.

12. The apparatus according to claim 9, wherein at least one of the secret keys is shared with another circuit of the electronic apparatus.

13. The apparatus according to claim 9, wherein the first encryption/decryption unit comprises a cache memory in which the initialization vector and the secret-key identifier that are read from the external memory are stored in association with one another.

14. The apparatus according to claim 9, wherein the second encryption/decryption unit includes:
the second set of registers configured to store a first list of secret keys, one of which is the shared key, each in association with a respective key identifier;

a second secret keys selection unit configured to select a secret key from the first list of secret keys stored in the second set of registers;

a second segmentation unit configured to segment data in such a way as to form a stream of data words of determined size;

a second generator of initialization vectors configured to generate a stream of initialization vectors changing value with each data word;

a second generator of pseudorandom numbers configured to generate, for each data word formed by the second segmentation unit, based on said secret key and on a determined one of the initialization vectors, a pseudorandom number of determined size;

a second combination unit configured to continuously combine the data word and the corresponding pseudorandom number, so as to generate an encrypted data word;

second means for storing in the external memory each data word encrypted in association with the determined initialization vector and the key identifier associated with the secret key that has served to encrypt same;

second reading means for reading from the external memory one of the encrypted data words together with the determined initialization vector and with the key identifier of the secret key that has served to encrypt the encrypted data word being read;

second selection means for selecting a secret key based on the list of keys stored in said registers and based on the key identifier read from the external memory, wherein the generator of pseudorandom numbers is structured to generate, for the encrypted data word read from the external memory, based on said secret key and on said initialization vector, a pseudorandom number of determined size; and wherein the combination unit is structured to combine the data word and the corresponding pseudorandom number, in such a way as to decrypt said encrypted data word read from the external memory, wherein the shared secret key is shared between said encryption/decryption units in such a way as to form a secure subsystem.

15. The method according to claim 1, comprising:
retrieving the selected secret key from the set of registers of the first circuit based on the key identifier associated with the selected secret key.

16. An electronic cryptographic apparatus having a number of shared secret keys, comprising:
a first circuit including:
a respective set of protected key registers configured to store the number of shared secret keys in a specified order, wherein each shared secret key is associated with a respective key identifier that is an index to a respective register of the respective set of protected key registers of the first circuit and to a respective register of a respective set of protected key registers of a second circuit;
a respective encryption unit configured to encrypt segmentized data words into encrypted data words based at least in part on an initialization vector and a respective shared secret key of the number of shared secret keys stored in the respective set of protected key registers of the first circuit; and
a respective processor unit configured to store the encrypted data words in an external memory; and
the second circuit including:
the respective set of protected key registers configured to store the number of shared secret keys in the specified order;

a respective processor unit configured to read the encrypted data words in the external memory; and
a respective decryption unit configured to decrypt the encrypted data words based at least in part on the initialization vector and a respective shared secret key of the set of the number of shared secret keys stored in the respective set of protected key registers of the second circuit.

17. The electronic cryptographic apparatus of claim 16, wherein the respective processor unit of the first circuit is further configured to store at least one of the initialization vector and a respective key identifier associated with the respective shared secret key in the external memory, and wherein the respective processor unit of the second circuit is further configured to read at least one of the initialization vector and the respective key identifier stored in the external memory.

18. The electronic cryptographic apparatus of claim 17, wherein the respective encryption unit of the first circuit further includes:
a segmentation unit configured to segment data in such a way as to form a stream of data words of determined size;
a respective generator of initialization vectors configured to generate a stream of initialization vectors changing value with each data word;
a respective generator of pseudorandom numbers configured to generate, for each data word, based on the shared secret key and on a determined one of the initialization vectors, a respective pseudorandom number of determined size; and
a respective combination unit configured to combine the data word and the corresponding pseudorandom number, so as to generate an encrypted data word.

19. The electronic cryptographic apparatus of claim 18, wherein the second circuit further includes a respective secret key selector configured to select the respective shared secret key of the set of the number of shared secret keys stored in the respective set of protected key registers of the second circuit based at least on the respective key identifier.

20. The electronic cryptographic apparatus of claim 19, wherein the respective secret key selector of the second circuit is further configured to select, for each data word, the respective shared secret key based at least on a respective key identifier associated with the respective selected shared secret key, and wherein the respective decryption unit of the second circuit further includes:
a respective generator of pseudorandom numbers configured to generate, for each data word, based on the respective selected shared secret key and on the initialization vector, a respective pseudorandom number of determined size; and
a combination unit configured to combine the data word and the corresponding pseudorandom number, in such a way as to decrypt said data word.

* * * * *

UNITED STATES PATENT AND TRADEMARK OFFICE
CERTIFICATE OF CORRECTION

PATENT NO. : 7,657,034 B2  Page 1 of 1
APPLICATION NO. : 10/966833
DATED : February 2, 2010
INVENTOR(S) : Völp et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1420 days.

Signed and Sealed this

Thirtieth Day of November, 2010

David J. Kappos
*Director of the United States Patent and Trademark Office*